United States Patent [19]

Weaver

[11] Patent Number: 4,502,705
[45] Date of Patent: Mar. 5, 1985

[54] SEMIRECUMBENT TANDEM BICYCLE

[76] Inventor: James B. Weaver, 13737 - 2nd NE., Seattle, Wash. 98125

[21] Appl. No.: 499,631

[22] Filed: May 31, 1983

[51] Int. Cl.³ .............................................. B62M 3/00
[52] U.S. Cl. ..................... 280/231; 280/234; 280/242 R; 280/249; 280/261; 280/263; 280/281 LP; 474/88; 474/89
[58] Field of Search ............... 280/231, 230, 232, 233, 280/234, 235, 224, 225, 242 R, 249, 250, 259, 260, 261, 263, 7.1, 281 R, 281 LP, 215, 217; 74/594.1, 665 GE; 474/88, 89

[56] References Cited

U.S. PATENT DOCUMENTS

| | | | |
|---|---|---|---|
| 614,320 | 11/1898 | Dennison | 280/234 |
| 4,108,460 | 8/1978 | Silva, Jr. | 280/263 X |

FOREIGN PATENT DOCUMENTS

| | | | |
|---|---|---|---|
| 76228 | 12/1947 | Czechoslovakia | 280/261 |
| 48011 | 1/1937 | France | 280/231 |
| 830218 | 5/1938 | France | 280/232 |
| 850061 | 8/1939 | France | 280/261 |
| 922247 | 1/1947 | France | 280/242 R |

*Primary Examiner*—Joseph F. Peters, Jr.
*Assistant Examiner*—Mitchell J. Hill
*Attorney, Agent, or Firm*—Ward Brown; Robert W. Beach

[57] ABSTRACT

Separate pedal cranks are provided for the front and rear riders of a tandem bicycle having a front wheel of substantially smaller diameter than the rear wheel. Such front wheel is carried by a front fork journaled in a steering head directly below the front seat. The front pedal crank is carried at the end of a support arm extending generally horizontally forward from the steering head so that the front rider pedals in a sitting position with his or her legs extending forward. The front fork is connected to a steering shaft journaled in an upright steering post located behind the front seat. A rear seat substantially higher than the front seat is supported on an upright saddle post spaced rearward from the steering post but sufficiently close thereto for steering control of the bicycle by the rear rider. The bottom end portions of the two upright posts are connected by a long and straight bottom crossbar inclined upward and forward from the bottom end portion of the saddle post and extending beyond the steering post to the steering head. The front and rear pedal cranks are interconnected by two endless chains through an intermediate hub allowing the front rider to freewheel while the rear rider is pedaling and also allowing the speed of rotation of the front pedal crank to be adjusted relative to the speed of rotation of the rear pedal crank.

9 Claims, 4 Drawing Figures

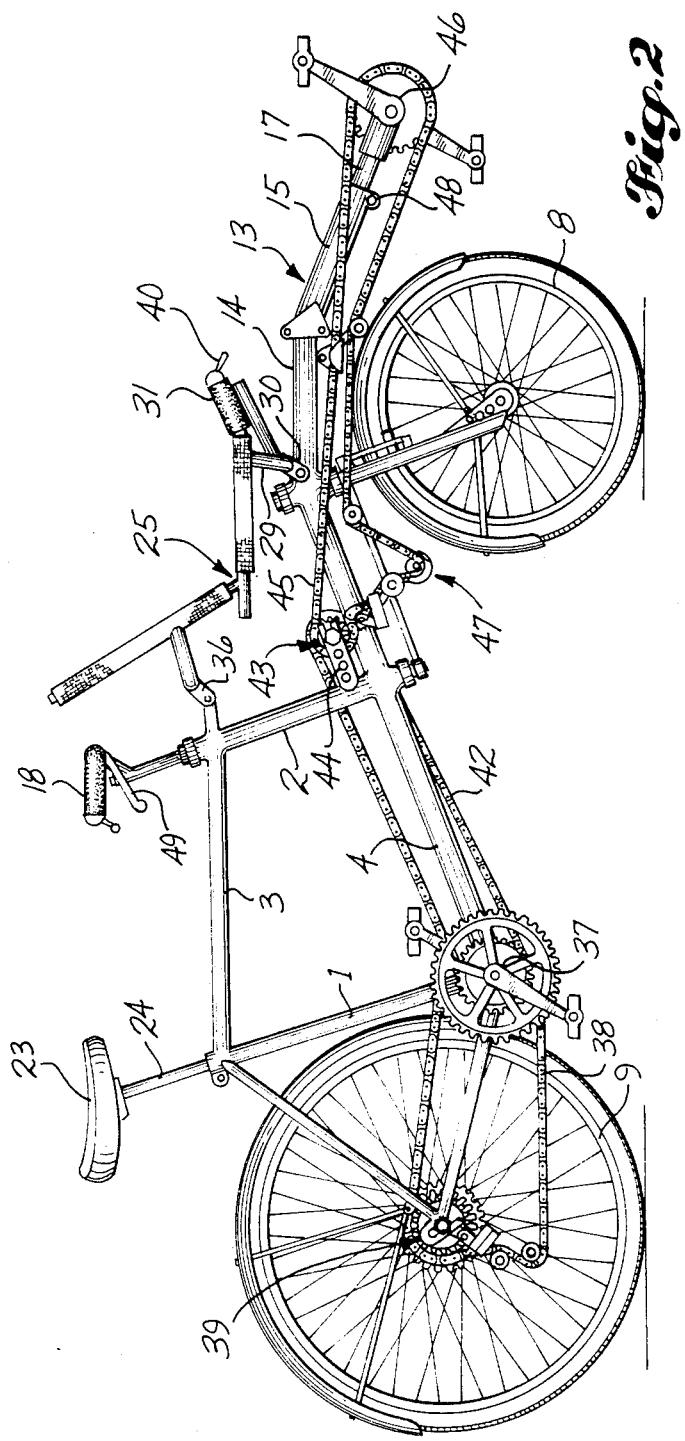

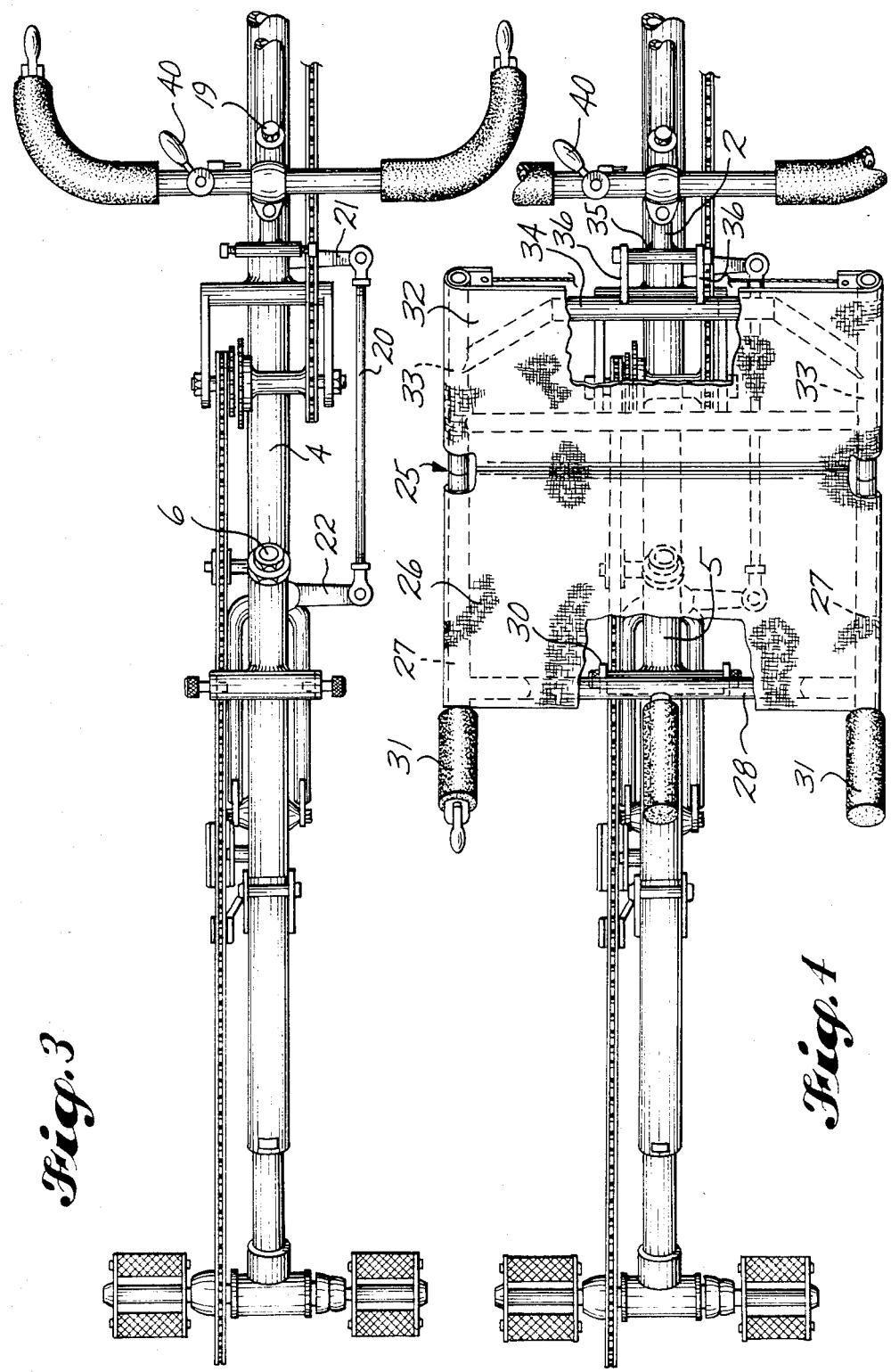

SEMIRECUMBENT TANDEM BICYCLE

BACKGROUND OF THE INVENTION

1. Field of the Invention

The present invention relates to a tandem bicycle.

2. Prior Art

A conventional tandem bicycle includes front and back wheels of substantially equal diameter and front and back seats or saddles at approximately the same height. Separate pedal cranks are provided substantially directly below the saddles, respectively, so that each rider pedals in the conventional, substantially upright position. The chain wheels of the two pedal cranks are interconnected such that they rotate in unison. The front rider or captain controls the steering by the swingable front handlebars connected to the turnable front fork through the steering head, and also usually controls the transmission, if any, and the brakes. The rear rider or stoker is positioned directly behind the captain.

To accommodate the two riders, a long wheel base is required which results in a larger turning radius and can create difficulty in maneuvering the bicycle at slow speed. In addition, the long wheel base increases the weight of the frame, can cause problems in transporting or storing the bicycle and makes it difficult for the bicycle to be ridden by a single rider.

Other problems associated with conventional tandem bicycles are that the stoker's view ahead is obstructed by the captain, the captain must take his or her eyes off the road in order to turn to talk to the stoker and neither rider can freewheel while the other rider is pedaling, nor can either rider pedal at a different speed than the other rider. In general, a conventional tandem bicycle is best suited for experienced riders having about the same strength and stamina.

SUMMARY OF THE INVENTION

It is an object of the present invention to provide a tandem bicycle which can be ridden comfortably by riders of substantially different experience, strength or stamina.

It also is an object to provide such a bicycle which can be ridden comfortably by one rider.

An additional object is to provide such a bicycle which is of compact construction so that the bicycle is easy to transport and store, but strong enough to support two adult riders safely.

A further object is to provide such a bicycle which can be adapted to riders, particularly stokers, of a wide range of sizes, such as both children and adults.

Another object is to provide such a bicycle which allows both riders a clear view of the road ahead.

Still another object is to provide such a bicycle in a form that allows the captain, that is, the rider controlling the steering and, preferably, the brakes, to talk to the stoker without taking his or her eyes off the road.

Other objects are to provide such a bicycle with a low center of gravity to increase the captain's control over the bicycle and, particularly, to provide such a bicycle which is easy to maneuver at slow speed.

These and other objects are accomplished by the semirecumbent tandem bicycle described in detail below.

BRIEF DESCRIPTION OF THE DRAWINGS

FIG. 2 is a right side elevation of the bicycle of FIG. 1.

FIG. 3 is a fragmentary top plan of the bicycle of FIG. 1 with the front seat removed.

FIG. 4 is a fragmentary top plan of the bicycle of FIG. 1 with parts broken away.

DETAILED DESCRIPTION OF THE PREFERRED EMBODIMENT

Figure 1:
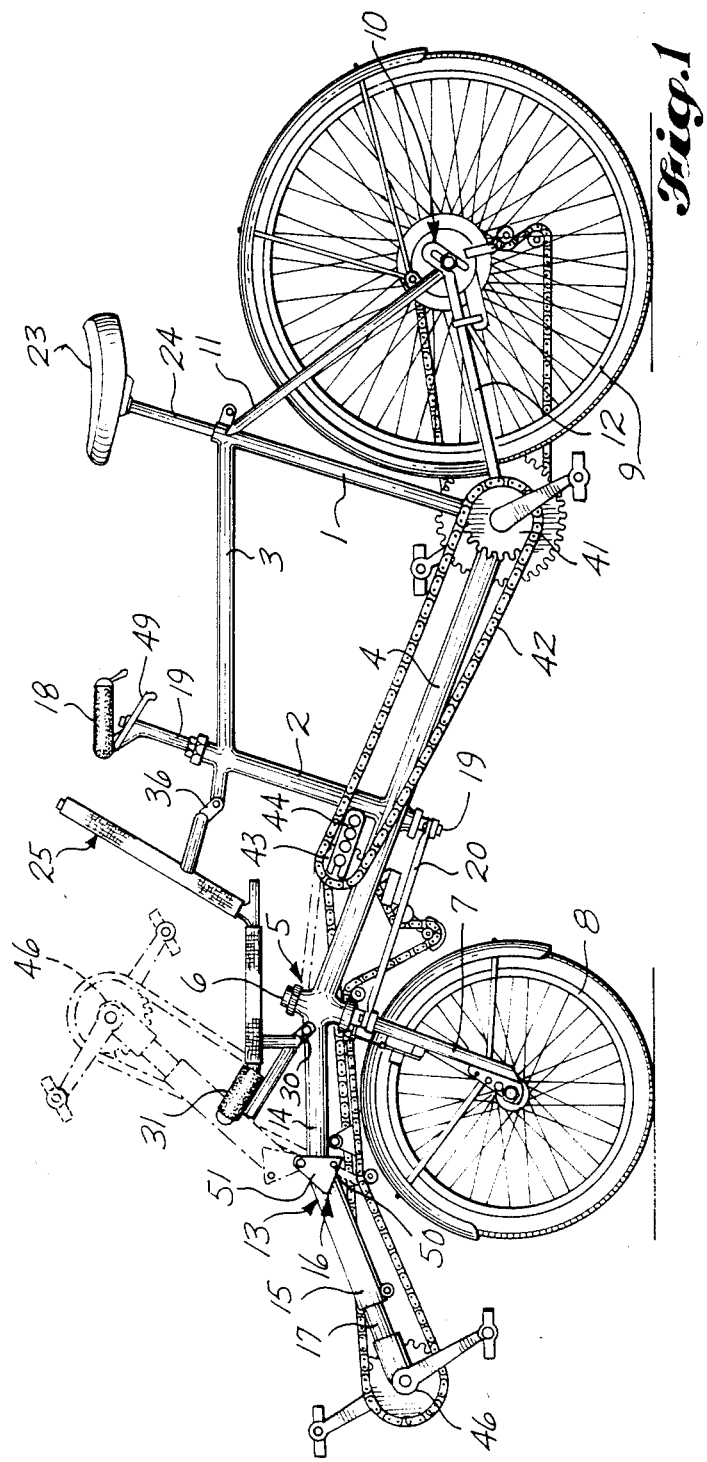
FIG. 1 is a somewhat diagrammatic left side elevation of a semirecumbent tandem bicycle in accordance with the present invention.

As shown in FIG. 1, the frame of the semirecumbent tandem bicycle of the present invention includes a pair of generally upright, longitudinally spaced tubular posts, namely, the rear saddle post 1 and the front steering post 2. A high crosstube 3 extends substantially horizontally between upper end portions of the two posts, respectively. The bottom end portions of the posts are connected by a long and straight bottom crosstube 4 which is inclined upward from the lower end portion of the saddle post 1 and projects forward a substantial distance beyond the steering post 2 to the steering head 5. An upright front steering shaft 6 is journaled in the steering head and carries the turnable front fork 7 mounting the small front wheel 8.

The rear wheel 9 is of substantially larger diameter than the front wheel and is carried by a rear fork assembly 10 projecting rearward from the saddle post 1. Such rear fork assembly includes top stays 11 inclined downward from the upper end portion of the saddle post and bottom stays 12 extending horizontally rearward from the bottom end portion of such post, the rear ends of the stays at corresponding sides of the rear wheel being welded together. The frame of the bicycle is completed by a front pedal crank support arm 13 extending generally horizontally forward from the steering head 5 to a location a substantial distance forward of the leading edge of the front wheel. Such support arm is formed in three tubular sections. A stationary rear section 14 is cantilevered from the steering head 5. A middle section 15 is joined to the rear section by a lockable hinge joint 16. A front section 17 is slidable fore and aft in the bore of the middle section 15 for adjusting the overall length of the composite support arm 13.

Steering of the bicycle of the present invention is accomplished by manipulation of conventional handlebars 18 carried at the upper end portion of a rear steering shaft 19 offset rearward from but substantially parallel to the front steering shaft 6 journaled in the steering head 5. As best seen in FIG. 3, the steering linkage for coordinating rotation of the two steering shafts includes a longitudinally extending tie rod 20 connected between the free end portions of lever arms 21 and 22 projecting radially outward, transversely of the length of the bicycle, from the bottom end portions of the front and back steering shafts 6 and 19, respectively, below the bottom crosstube 4 of the frame.

As shown in FIGS. 1 and 2, for supporting the rear rider or captain, a conventional rear saddle 23 is mounted on the upper end portion of a generally upright saddle shaft 24 which has its lower end portion slidably received in the bore of the saddle post 1. For supporting the front rider or stoker, a front seat assembly 25 is detachably mounted on the bicycle frame ahead of the steering post 2 and generally over the front wheel 8. Such front seat assembly is best seen in FIG. 4 and includes a horizontal bottom or seat portion 26 of fabric or other flexible sheet material stretched between laterally spaced, longitudinally extending seat frame members 27 which are connected by a generally U-shaped seat support bar 28. The central portion of such support bar is mounted in a bracket 29 welded to the top of the bicycle frame slightly forward of the steering head 5. Bolts threaded into the bracket and extending through mounting lugs 30 projecting downward from the support bar normally secure the support bar in the bracket. The leading end portions of the longitudinally extending seat frame members 27 are bent slightly upward to form handle grips 31 for the front rider at opposite sides of the seat portion 26.

The front seat assembly also includes an inclined back portion 32 of fabric or other flexible sheet material stretched between laterally spaced back frame members 33 inclined upward and rearward from the rear end portions of the longitudinally extending seat frame members 27. A generally U-shaped back support bar 34 is connected between the inclined back frame members 33 and has its central portion connected to a bracket 35 mounted on the upper end portion of the steering post 2. Bolts threaded into the bracket and extending through mounting lugs 36 projecting generally rearward from such back support bar normally secure the back support to the bracket.

As seen in FIG. 2, the drive train for the bicycle of the present invention includes a rear pedal crank 37 journaled in a hub at generally the junction of the bottom end of the saddle post 1 and the rear end of the bottom crosstube 4 substantially directly below the rear saddle 23. Consequently, the captain rides in the conventional substantially upright position while controlling the steering by the handlebars 18. Rotary power applied to the pedals of the rear pedal crank by the captain is transmitted to the back wheel 9 of the bicycle by an endless chain 38 extending around conventional derailleur gears including any one of several chainwheels or sprockets carried by the pedal crank 37 and any one of one or more sprockets of the freewheel rear hub 39. The gear ratio can be controlled by a gear lever 40 mounted on the handlebars as shown in FIGS. 3 and 4.

An additional chainwheel 41, seen in FIG. 1, is carried by the rear pedal crank 37 and, returning to FIG. 2, is interconnected by an endless chain 42 with a sprocket of an intermediate hub 43 carried generally behind and below the front seat assembly 25 on a bracket 44 projecting forward from the steering post 2. Preferably, such intermediate hub 43 has a second set of derailleur gears and is of the freewheel type such as would be used for the back hub of a single bicycle.

A third endless chain 45 interconnects another sprocket of the intermediate hub 43 with the chainwheel of a front pedal crank 46 journaled in a hub at the leading end portion of the generally horizontally extending front pedal crank support arm 13, that is, at the leading end portion of the front section 17 of such support arm. Unlike the situation for the captain, the front pedal crank 46 is positioned only slightly below and a substantial distance forward of the front seat assembly 25 so that the stoker sits in semirecumbent position while pedaling, and at a much lower level than the captain. Rotary force transmitted to the front pedal crank by the stoker is transmitted through the three endless chains to the rear wheel of the bicycle. The intermediate derailleur hub 43 allows the front rider to adjust his or her pedaling speed independently of the rear rider, such as by use of a conventional gear lever 40 mounted on one of the handle grips 31. In addition, the front rider can freewheel even while the rear rider is pedaling so that the bicycle is suited for use by riders of different experience, strength and stamina by seating the weaker of the two in the front stoker's seat.

To accommodate stokers of different height, the location of the front pedal crank can be adjusted by sliding the front section 17 of the front pedal crank support arm 13 fore and aft in the bore of the middle section 15 as permitted by the conventional chain-tensioning mechanism 47 adjacent to the intermediate hub. A setscrew or bolt 48 is provided for locking such front section in any desired position.

Preferably the bicycle includes conventional caliper brakes (not shown) for the front and back wheels, which are controlled by the captain by brake levers 49 mounted on the handlebars 18.

When it is desired to transport or store the bicycle of the present invention, the front seat assembly can be removed quickly and easily by loosening the bolts extending through the mounting lugs 30 and 36. In addition, while the middle and front sections 15 and 17 of the front pedal crank support arm 13 normally are locked in fixed position relative to the rear section 14, the hinge joint 16 can be unlocked by removing the pin or bolt 50 normally extending through registered holes in adjacent hinge plates 51 carried by the support arm sections 14 and 15, which allows the middle and front sections 15 and 17 to be swung upward and rearward about the axis of a pivot shaft 52 to the position indicated in broken lines in FIG. 1.

The mounting of the front seat assembly over the front wheel of the bicycle allows a compact and simple but strong frame construction that reduces the wheel base of the bicycle as compared to the wheel base of a conventional tandem bicycle. Accordingly, the turning radius is shorter. In combination with the low center of gravity achieved by seating the stoker at a lower level, the shorter turning radius improves the maneuverability of the bicycle at slow speed. A single rider can ride the bicycle in the captain's position.

In addition to accommodating a stoker, the front seat can be used for carrying a load or an infant or a handicapped person in a convenient location in front of the captain. For any of these uses, an optional front seat or load-carrying attachment can be provided.

Also, the positioning of the front seat assembly at a substantially lower height than the rear seat allows the captain to see the road ahead clearly over the head of a stoker, and to communicate freely with the stoker without the captain taking his or her eyes off the road ahead while steering.

In a modification, the front pedal crank could be positioned at substantially the location indicated in broken lines in FIG. 1 by a modified pedal crank support arm. The power train for the front pedal crank could be provided with a higher gear ratio so that a front rider, such as a handicapped person not having leg control, could "pedal" with his or her arms and participate in the ride which is not possible in any known tandem bicycle.

I claim:

1. In a bicycle for carrying a front rider and a rear rider, the improvement comprising the combination of:
a rear wheel;

a front wheel of substantially smaller diameter than said rear wheel;

a frame including rear fork means for carrying said rear wheel, front fork means for carrying said front wheel, a steering head above said front wheel and rotatably mounting said front fork means for steering control of the bicycle and post and crossbar means for connecting said rear fork means and said steering head;

a rear seat for the rear rider, carried by said frame adjacent to said rear wheel and having a generally horizontal seat portion;

a front seat for the front rider, carried by said frame, overlying said steering head and including a generally horizontal seat portion disposed at a height substantially lower than the height of said seat portion of said rear seat; and drive train means for transferring power to said rear wheel and including a front pedal crank for the front rider, a rear pedal crank for the rear rider and means operatively connecting one of said wheels and said front and rear pedal cranks.

2. In a bicycle for carrying a front rider and a rear rider, the improvement comprising the combination of:

a rear wheel;

a front wheel of substantially smaller diameter than said rear wheel;

a frame including an upright saddle post, rear fork means extending rearward from said saddle post for carrying said rear wheel, an upright steering post spaced forward from said saddle post, a long and straight bottom crossbar connecting the bottom end portions of said saddle post and said steering post, said bottom crossbar being inclined upward and forward from the bottom end portion of said saddle post and extending linearly therefrom to a location a substantial distance forward beyond the bottom end portion of said steering post, a steering head carried at the forward end portion of said bottom crossbar in front of said steering post, front fork means for carrying said front wheel and rotatably mounted in said steering head and a front pedal crank support arm cantilevered and extending forward from said steering head;

a rear seat for the rear rider supported above said saddle post;

a front seat for the front rider carried by said frame in front of said steering post and at a level substantially below the level of said rear seat;

steering means including a first upright steering shaft turnable by the rear rider and journaled in said steering post, a second upright steering shaft journaled in said steering head and carrying said front fork means and means for coordinating rotation of said steering shafts for steering control of the bicycle by the rear rider; and drive train means for transferring power to said rear wheel and including a rear pedal crank for the rear rider, a front pedal crank carried at the forward end portion of said front pedal crank support arm and means operatively connecting said front and rear pedal cranks and one of said wheels.

3. In the bicycle defined in claim 2, the front seat overlying the steering head.

4. In the bicycle defined in claim 2, the rear pedal crank being disposed at the junction of the bottom end of the saddle post and the rear end of the bottom crossbar substantially directly below the rear seat so that the rear rider pedals in the conventional substantially upright position.

5. In the bicycle defined in claim 2, the front pedal crank being disposed a substantial distance forward of the front seat and at a height below the front seat so that the front rider pedals in sitting position with his or her legs extending forward and downward.

6. In the bicycle defined in claim 2, the front pedal crank support arm including a rear portion extending forward from the steering head and a front portion inclined forward and downward from said rear portion, and the front pedal crank being carried at the forward end portion of said front pedal crank support arm forward portion in front of the front wheel.

7. In the bicycle defined in claim 2, the drive train means including an intermediate hub between the front and rear pedal cranks and having a plurality of sprockets, a first endless chain interconnecting the front pedal crank and one of said sprockets of said intermediate hub and a second endless chain connecting another of said sprockets of said intermediate hub and the rear pedal crank, said intermediate hub being of the freewheel type for enabling the front rider to freewheel while the rear rider is pedaling.

8. In the bicycle defined in claim 7, the intermediate hub being of variable gear ratio so as to permit adjustment of the speed of rotation of the front pedal crank relative to the speed of rotation of the rear pedal crank.

9. In a bicycle having front and rear wheels and front and rear seats for front and rear riders, a drive train comprising a front pedal crank positioned for being pedaled by the front rider and having a chain wheel, a rear pedal crank positioned for being pedaled by the rear rider and having at least two chains rotated in synchronism, an intermediate hub between said front and rear pedal cranks and having at least two sprockets, a first endless chain interconnecting said chain wheel of said front pedal crank and one sprocket of said intermediate hub for coordinated rotation thereof, a second endless chain interconnecting another sprocket of said intermediate hub and one chain wheel of said rear pedal crank for coordinated rotation thereof, a rear hub carried by the rear wheel and having a driving sprocket, and a third endless chain interconnecting the other chain wheel of said rear pedal crank and said driving sprocket for coordinated rotation thereof, said intermediate hub being of the freewheel type so as to enable said rear pedal crank to rotate while said front pedal crank is not rotating and being of variable gear ratio so as to permit adjustment of the speed of rotation of said front pedal crank relative to the speed of rotation of said rear pedal crank.

* * * * *

UNITED STATES PATENT AND TRADEMARK OFFICE
CERTIFICATE OF CORRECTION

PATENT NO. : 4,502,705

DATED : March 5, 1985

INVENTOR(S) : James B. Weaver

It is certified that error appears in the above-identified patent and that said Letters Patent are hereby corrected as shown below:

Column 6, line 42, cancel "chains" and insert...chain wheels...

Signed and Sealed this

Thirtieth Day of July 1985

[SEAL]

Attest:

DONALD J. QUIGG

Attesting Officer     Acting Commissioner of Patents and Trademarks